ADDING CIRCUIT USING THIN MAGNETIC FILMS

Filed July 21, 1960 5 Sheets-Sheet 1

INVENTORS
JOSEPH J. CHANG
THOMAS J. MATCOVICH
J. Donald Weber, Jr
AGENT

ADDING CIRCUIT USING THIN MAGNETIC FILMS

Filed July 21, 1960 5 Sheets-Sheet 2

INVENTORS
JOSEPH J. CHANG
THOMAS J. MATCOVICH
G. Donald Weber Jr.
AGENT

ADDING CIRCUIT USING THIN MAGNETIC FILMS

Filed July 21, 1960 5 Sheets-Sheet 3

*INVENTORS*
JOSEPH J. CHANG
THOMAS J. MATCOVICH
J. Donald Weber, Jr.
*AGENT*

ADDING CIRCUIT USING THIN MAGNETIC FILMS

Filed July 21, 1960 5 Sheets-Sheet 4

*INVENTORS*
JOSEPH J. CHANG
THOMAS J. MATCOVICH
J. Donald Weber, Jr.
*AGENT*

ADDING CIRCUIT USING THIN MAGNETIC FILMS

Filed July 21, 1960 5 Sheets-Sheet 5

INVENTORS
JOSEPH J. CHANG
THOMAS J. MATCOVICH
J. Donald Weber, Jr.
AGENT

United States Patent Office 3,192,370
Patented June 29, 1965

3,192,370

ADDING CIRCUIT USING THIN MAGNETIC FILMS

Thomas J. Matcovich, Willow Grove, Pa., and Joseph J. Chang, West Lafayette, Ind., assignors to Sperry Rand Corporation, New York, N.Y., a corporation of Delaware Filed July 21, 1960, Ser. No. 44,349
14 Claims. (Cl. 235—176)

This invention relates to a circuit which is adapted to utilize thin magnetic films as the switching elements thereof, and which is adapted for performing logic operations.

In the field of electronic computing machines and similar business machines, many logic circuits are utilized. In the past these logic circuits have used electro-mechanical relays, electronic vacuum tubes or transistors as their active switching elements. However, in order to permit faster operation of the machines whereby more operations may be performed per unit time, it is desirable to utilize logic circuits which have faster operating characteristics. Similarly, in order to permit miniaturization of these machines, it is desirable to utilize smaller elements therein. These advantages may be obtained by constructing logic circuits which use thin magnetic films as the switching elements. Magnetic films composed of approximately 80% Ni and 20% Fe for example, and having thicknesses on the order of 2000 A. have now been produced and investigated such that their properties may be reasonably accurately predicted. For example, thin permalloy films may be deposited by electroplating, evaporation, or thermo-chemical processes, on a Mylar or a glass substrate base for example, in the presence of a magnetic field whereby the films may have energies described as either isotropic or anisotropic. Reference is made, inter alia, to the Journal of Applied Physics, Thin Film Supplement to volume 30, No. 4, April 1959, for example page 262S.

Moreover, some of these thin magnetic films are more particularly described in terms of a uniaxial anisotropy energy of the form $E=K \sin^2 \theta$, where K is a constant characteristic of the material and $\theta$ is the angle between the magnetic vector and the anisotropy axis. The direction of the anisotropy axis associated with the uniaxial anisotropy energy of a particular film is determined by the direction of the magnetic field which is applied during the deposition or the subsequent annealing of the magnetic material. The films thus described may be further classified on the basis of the anisotropy field, $H_K$, and the intrinsic coercive force of the material, $H_c$. Referring particularly to films of the classification designated by $H_K > H_c = 0$, it has been shown that markedly different hysteresis loops are obtained when different operational fields are applied to the film. That is, the hysteresis loop is relatively square if the operational field is applied parallel to the anisotropy axis; and if the operational field is applied perpendicular to the anisotropy axis the open portion of the hysteresis loop collapses to a straight line and exhibits substantially no remanence. In general, except where otherwise indicated, the following description relates to a film in which the field is applied perpendicular to the anisotropy axis and which exhibits substantially no remanence. By properly biasing this type of film to a predetermined position on a horizontal portion of its hysteresis loop, the film may be placed in a so-called non-output producing condition; or alternatively, the film may be biased to the substantially vertical portion of the hysteresis loop which is its output producing condition.

In accordance with this invention, the advantages of thin magnetic films may be utilized in a logic circuit for use in business machines for example, by providing a plurality of thin magnetic films of the type described having the operational magnetic field applied perpendicularly to the anisotropy field so that the straight line hysteresis characteristic is obtained therefor. These films are biased to different static non-output producing conditions respectively. Furthermore, a plurality of driving signal sources are linked to each of said films by a plurality of windings. Upon the application of a drive signal to the logic circuit by one of said driving sources, one of the films will be driven into the output producing condition while the other films remain in the non-output producing condition. Similarly, by the application of drive signals by additional ones of the driving sources, certain ones of the films will be driven into the output producing condition and the one or more other films will reside in a non-output producing condition. By properly aligning these films and the associated driving wires and output wires, various logical operations, for example those of addition, may be achieved. That is, a sum output may be obtained for any one input source supplying a signal; a carry output may be obtained by the application of input pulses from any two input sources; and a sum and a carry output may be obtained if three input pulses are supplied by input sources.

An object of this invention is to provide new and improved circuits utilizing thin films.

Thus, an object of the invention lies in providing a logical circuit which utilizes thin magnetic films.

Another object of the invention is to provide a logical adder which is extremely small in size.

Still another object of the invention is to provide a high speed adder for use in digital computers.

Yet another object of the invention is to provide an adder which is highly reliable.

A further object of the invention is to provide a high speed adder which has a simple configuration.

A still further object of the invention is to provide a logical adder circuit which is inexpensive to build and maintain.

These and other objects and advantages of this invention and its operation will become more readily apparent from the following description and the accompanying drawings in which.

Figures 1, 2:
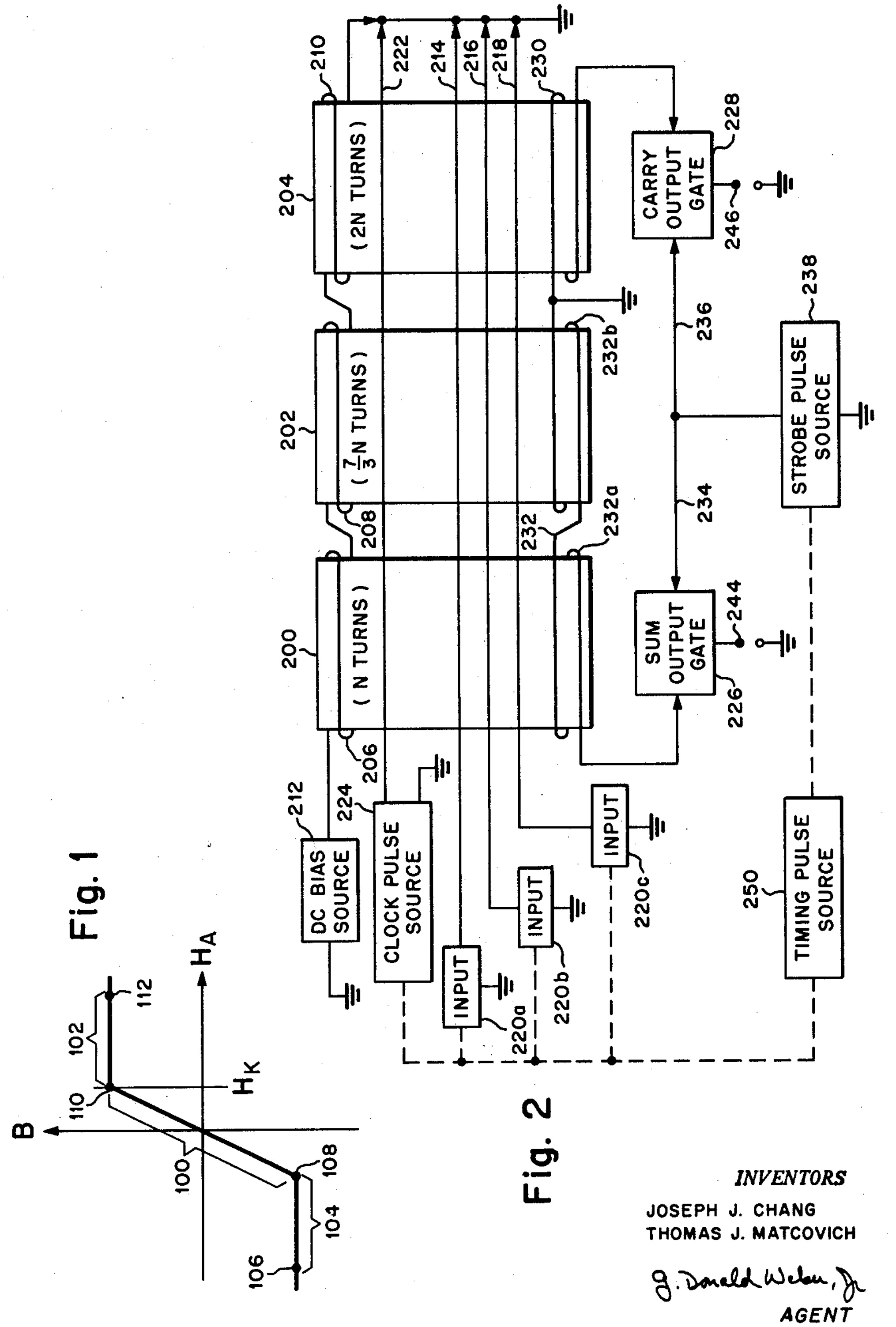
FIGURE 1 shows a typical B-H characteristic of a thin magnetic film along the difficult axis.
FIGURE 2 shows an adder circuit utilizing three thin magnetic films in accordance with the invention.
Figures 3A, 3B, 3C:
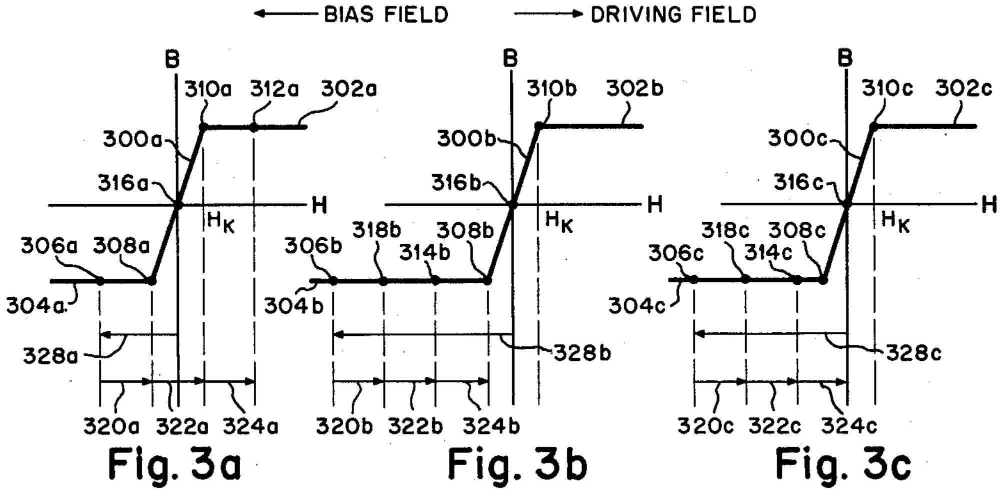
Figure 5A:
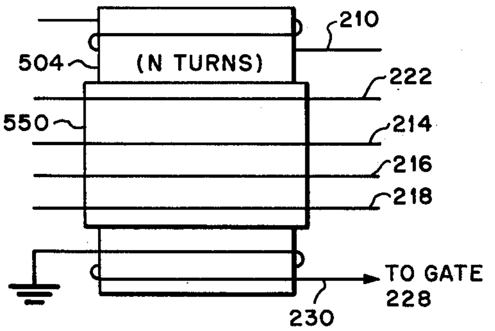
Figure 5B:
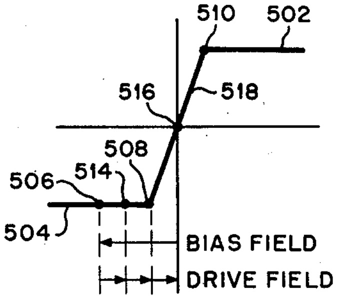
Figures 7A, 7B, 7C:
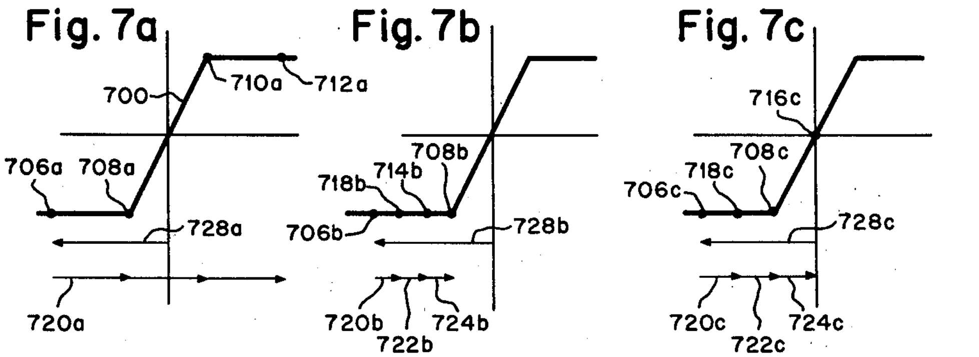
Figure 4:
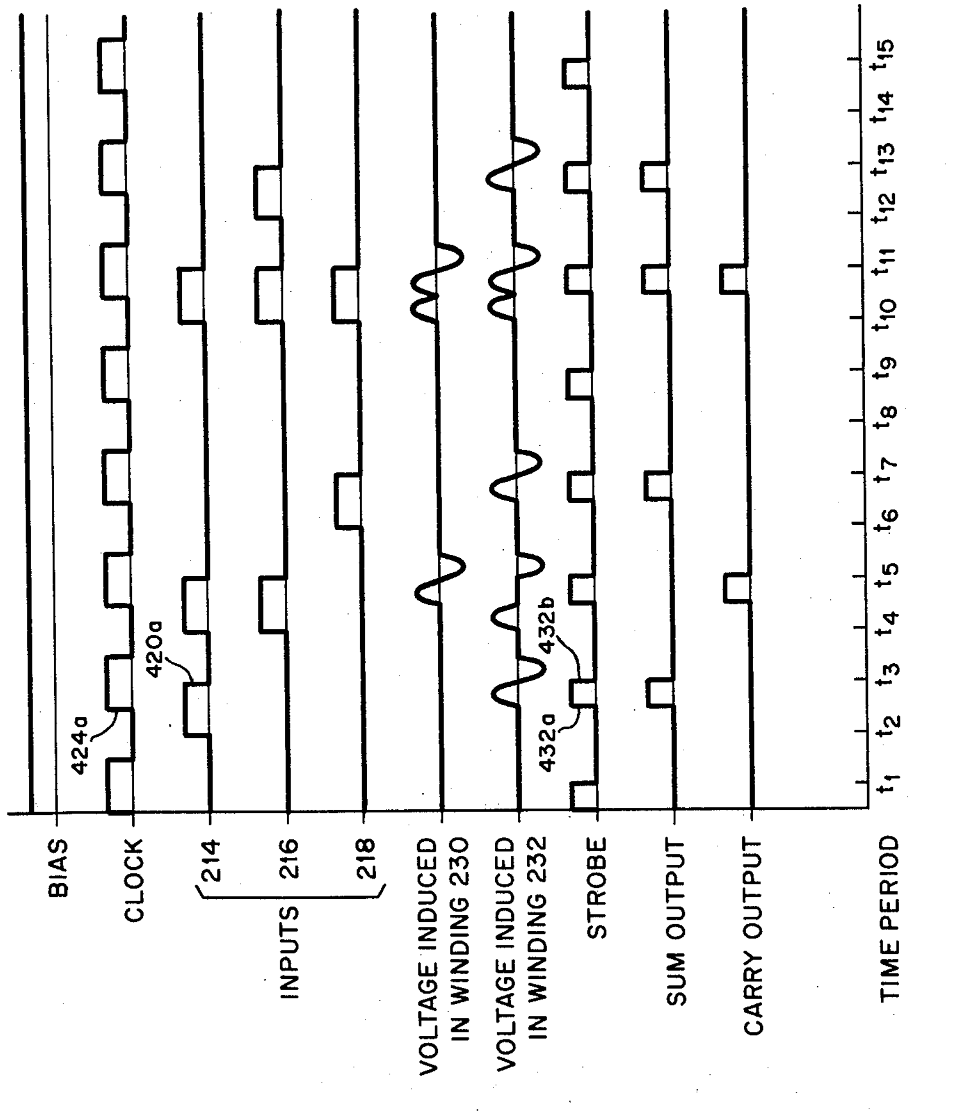
Figure 6:
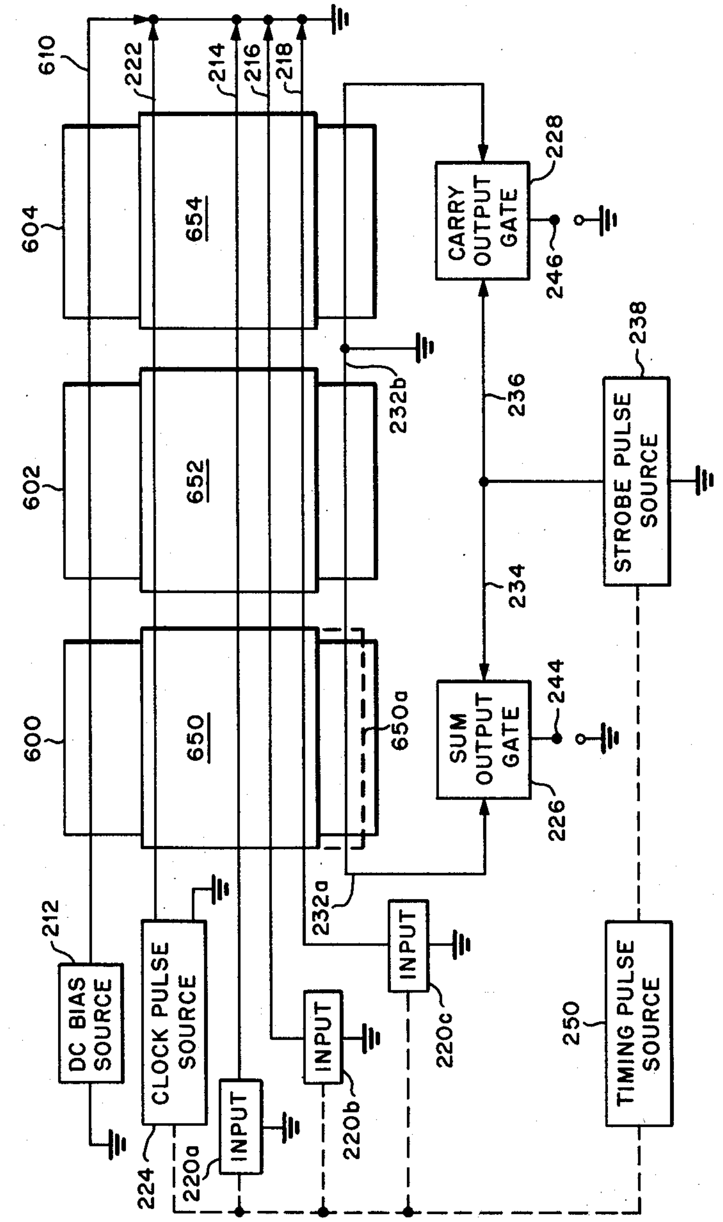
Figure 8:
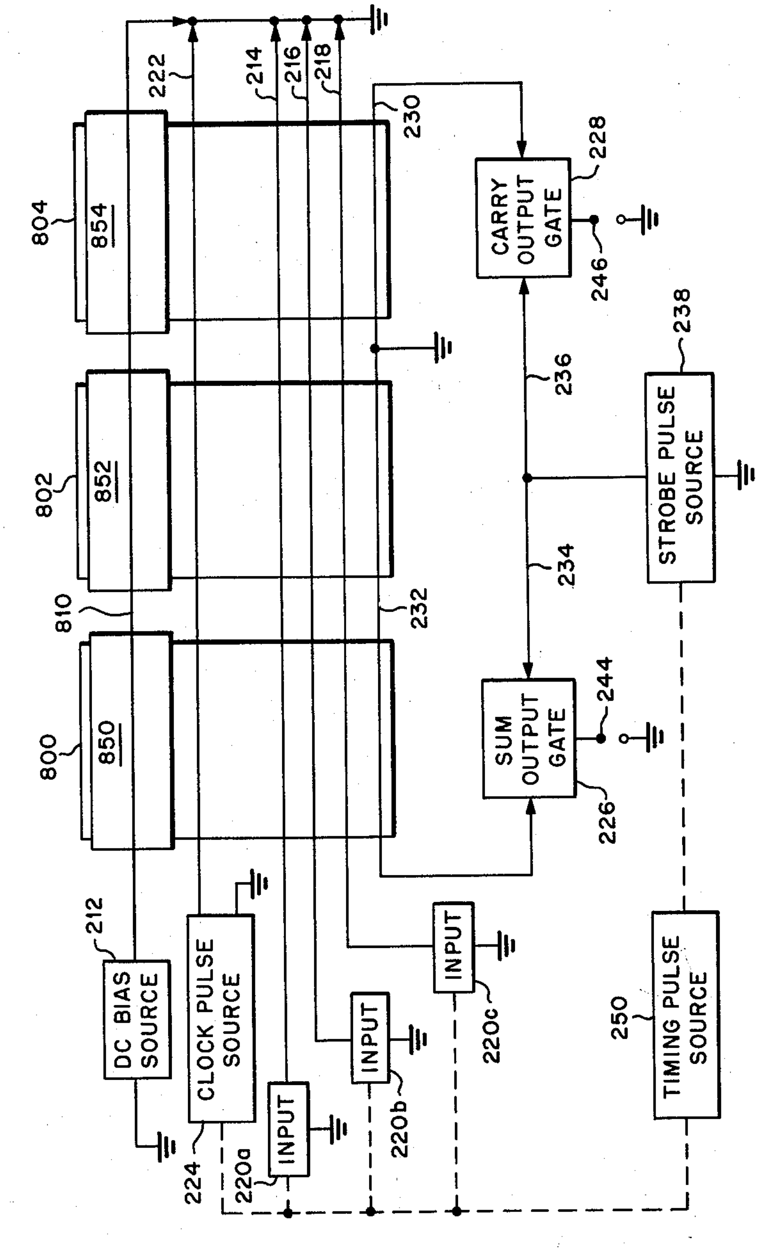

FIGURES 3*a* through 3*c* show the respective B-H characteristics of the three thin films shown in FIGURE 2;

FIGURE 4, is a timing diagram which shows the pulses at portions of the circuit at various times;

FIGURE 5*a*, shows an embodiment of the invention wherein drive windings are spaced from one of the thin magnetic films;

FIGURE 5*b*, shows the B–H characteristic for the modified film of FIGURE 5*a*;

FIGURE 6, shows another embodiment of the invention wherein the drive windings are spaced from all three thin magnetic films;

FIGURES 7*a* through 7*c* show the respective B–H characteristics of the three thin films shown in FIGURE 6; and FIGURE 8, shows an embodiment of the invention wherein bias windings are spaced from all three thin magnetic films.

Referring now to FIGURE 1, there is shown a hysteresis loop previously described as being for a thin film having a uniaxial anisotropy energy. It is assumed that a magnetic field is applied to the film perpendicularly to the anisotropy axis so that the hysteresis loop is represented by the substantially straight line shown.

In this loop configuration, the portion designated by reference numeral 100 is the output producing portion; and the portions 102 and 104 are the non-output producing portions. That is, when a film of the proper type is operating in portion 100, the flux is changing and an output signal may be produced accordingly. When the film is operating in the portions 102 or 104, the flux is substantially saturated and unchanging and no output signal is produced. For example, when the film is biased to the lacation 106 it is in the non-output producing condition and no output signal is produced until an input signal is supplied which has sufficient magnitude to drive the film past location 108 and along portion 100. When the film is being driven along a part of portion 100, for example between locations 108 and 110, an output signal will be produced. Conversely, if the input signal is only sufficiently large to drive the film along portion 104 between locations 106 and 108 (or alternatively along portion 102 between locations 110 and 112), no output signal is produced.

Turning now to FIGURE 2, magnetic elements in the form of thin magnetic films 200, 202, and 204 are shown. Each of these films preferably exhibits a similar hysteresis loop such as the linear hysteresis loop shown in FIGURE 1. It is noted that the limitation is preferred, but is not necessary as will be described subsequently in relation to FIGURES *5a* and *5b*. Bias windings 206, 208 and 210 are linked to films 200, 202 and 204 respectively. Each of the bias windings 206, 208 and 210 is connected in series with each other and with D.C. bias potential source 212 to thereby provide a circuit for biasing the various films as desired (see FIGS. *3a–3c*). Furthermore, each of the films 200, 202 and 204 is linked by the three input windings 214, 216 and 218 which are coupled to input pulse sources 220*a*, 220*b* and 220*c*. The input pulse sources 220*a*, 220*b* and 220*c* are shown as a plurality of separate circuits or units for convenience. However, the input signals may in actuality be supplied by a single unit. The three films are also linked by a clock pulse winding 222 which is coupled to a clock pulse source 224. Each of these windings (viz. input windings and clock winding) is utilized in providing what is generally called the driving circuit. The interaction of the effects of the biasing circuit and the driving circuit is determinative of the output signals obtained on the output circuits.

The output circuits comprise a Sum output and a Carry output circuit. The Carry output circuit is composed of a sense winding 230 which is linked only to the Carry output film 204. The Sum output circuit comprises sense winding 232. For convenience winding 232 is shown as having two sections, viz. 232*a* and 232*b*. The sections 232*a* and 232*b* are linked to films 200 and 202 respectively.

Each of these sense windings is coupled from ground to a separate gate circuit. For example, the Sum sense winding is coupled to a gate 226 and the Carry sense winding is coupled to gate 228. These gate circuits may be composed of any of the many well known types, for example a tube which is normally biased to cut off but which conducts when properly triggered. The triggering signal is supplied to gates 226 and 228 via wires 234 and 236 by strobe pulse source 238. The strobe pulse source may preferably but not necessarily be triggered by the clock pulse source in order to provide synchronization, as will be apparent, subsequently.

The operation of the several films may be explained more easily by referring to FIGURE 2 in conjunction with FIGURES *3a*, *3b* and *3c*. For ease in identification of the several elements of FIGURES *3a* through *3c*, similar elements have been labelled with the same reference numeral and a letter appended thereto which corresponds to the figure letter. Similarly, the reference numbers are related to those of FIGURE 1 with the exception that these numerals are in the 300 series instead of the 100 series. For example, portion 100 (FIGURE 1) corresponds to portion 300*a*, 300*b* and/or 300*c* of FIGURES *3a*, *3b* and/or *3c*, respectively.

Referring now in particular to FIGURE *3a*, there is shown the hysteresis loop which is associated with a Sum film, for example film 200. The bias field applied via bias winding 206 (which has N turns) biases the film to location 306*a* in the non-output producing state 304*a*. The application of an input signal of unit magnitude (represented by arrow 320*a*) to one of the input windings 214, 216 or 218 drives the film (in the non-output producing state 304*a*) from location 306*a* to 308*a*. The bias produced by passing the D.C. bias current through the N turns of winding 206 (arrow 328*a*) is larger than a drive of unit magnitude and, for example, corresponds to one and a half units of drive (arrow 320*a*), whereas a bias produced by passing the D.C. bias current through a winding having $N/3$ turns would correspond to a bias to substantial saturation at point 308*a* from the zero bias point of 316*a*. While the film 200 is being thus driven, there is substantially no change of flux and, thus, no output signal produced on winding 232*a*. However, the film has now been driven to location 308*a* which is the "threshold value" or knee beyond which is the output producing portion 300*a* of the film 200. (Thus, the film is driven up to the output producing condition although no output signal is produced.) That is, in the event that a clock pulse is applied by clock source 224 to winding 222 (represented by arrow 322*a*) while the film is at location 308*a*, the film will be driven into the output producing state whereby an output signal voltage will be produced on winding 232*a*. However, in the absence of a strobe pulse from strobe source 238, this signal voltage will *not* pass output gate 226 as will be more fully explained subsequently and no signal will be produced at Sum output terminal 244.

If two input pulses are supplied to film 200 via any two of windings 214, 216 or 218, film 200 is driven from location 306*a* to location 310*a*, to produce a substantial change in flux. However, when the film is driven from location 306*a* to 308*a*, there will be no output signal because the traversed portion of the hysteresis loop is the non-output producing state 304*a*. When the film 200 is being driven between the locations 308*a* and 310*a* (through portion 300*a*) a voltage is induced in sense winding 232*a* similar to that induced by the clock pulse previously described. However, if the strobe pulse is absent this induced voltage does not pass output gate 226, and again there is no signal produced at the Sum output terminal 244. Furthermore it is important to note that if any further driving pulse (e.g. clock or input pulse) appears in winding 222 after the film has been driven to location 310*a*, no output signal is produced since portion 302*a* of the hysteresis loop also represents a non-output producing state of the film.

Similarly, if three input signals are applied by the input source 220 via input windings 214, 216 and 218, film 200 is driven from location 306*a* to location 312*a*, with the respective drives being represented by arrows 320*a*, 322*a*, 324*a* in FIGURE *3a*. In the absence of a strobe pulse, there is no output for the reasons ascribed above. That is, a clock pulse would only drive the film further along portion 302*a* which is the non-output producing portion of the hysteresis loop of film 200; the drive along portion 304*a* is in a no-output producing portion of the hysteresis loop; and the absence of strobe pulse precludes the possibility of an output pulse being produced while the film is being driven along region 300*a* of the hysteresis loop.

Similar to the previous detailed description of the operation of film 200, film 202 is biased to location 306*b*. This biasing condition is obtained by passing the D.C. bias current from bias source 212 through bias winding 208, which winding has for example $7/3N$ turns, to provide a bias (arrow 328*b*) corresponding to three and a half units of drive. Thus, film 202 is biased from the zero bias point 316*b* to the left on portion 304*b* of the hysteresis loop by an amount equal to three and a half units of drive, thereby requiring a plurality of input signals, viz. three input signals (arrow 320*b*, 322*b*, 324*b*) for the film to be switched to the threshold location 308*b*. Consequently, there will be an output on winding 232*b*, only when the clock pulse is supplied to drive the film to location 310*b*, after the application of three input signals has driven the film 202 to threshold location 308*b* but no output signal will be produced by the application of a clock pulse subsequent to the application of only one or two input signals, because the film 202 remains in saturation to the left of threshold location 308*b*.

Also, film 204 is biased to location 306*c*. This bias location is again achieved by passing the D.C. bias current through bias winding 210 which comprises a coil having 2N turns, to provide an effective bias (arrow 328*c*) corresponding to three units of drive. By biasing film 204 (the Carry output film) to location 306*c*, it will be seen that output signals may be produced on winding 230 after either two or three input signals have been applied via the input windings. That is, the application of two input signals (arrows 320*c* and 322*c*) by source 220, will drive film 204 from location 306*c* to 314*c*. No output can be obtained since this driving is all accomplished along the no-output producing portion 304*c*. However, the concurrent application of a clock pulse via winding 222 by source 224 will drive the film from location 314*c*, around the knee 308*c*, to location 316*c*. Upon traversing the portion 300*c* between locations 308*c* and 316*c*, the film produces an output signal on Carry output winding 230. Similarly, in the event that input signals (arrows 320*c*, 322 and 324*c*) are applied by source 224 on each of the three input windings, the film is driven from location 306*c* to location 316*c* (via knee 308*c*). This driving of the film will be sensed by the voltage induced in output winding 230 but will not pass output gate 228 in the absence of a strobe pulse to be described in relation to FIGURE 4.

Referring now to FIGURE 4, there is shown a timing diagram which shows the appearance of signals at various points throughout the circuit. For convenience, the time periods $t_1$–$t_{15}$ have been shown as corresponding to the clock pulse times. It is to be understood that the timing diagram is merely illustrative and the frame of reference is relatively unimportant so long as the indicated time relations between the several signals are properly maintained. That is, the leading edge 432*a* of the strobe pulse supplied by strobe source 238 is to be substantially coincidental with leading edge 424*a* of the associated clock pulse supplied by source 224 and, preferably, the trailing edge 432*b* of the strobe pulse is to be substantially coincidental with the trailing edges 420*a* of the associated input signals supplied by input source 220. Thus, the strobe pulse (supplied by source 238) appears at the start of the clock signal and terminates at the end of the input signal. This type of operation has the effect of eliminating the spurious output pulses produced by the voltages induced in windings 230 and 232 at times other than when the several films are being driven by a clock driving pulse. In addition, this type of operation eliminates spurious output pulses which might otherwise be produced by the induction of negative going voltage signals in the sense windings 230, 232 by the collapsing of the driving fields. That is, since the strobe pulse has terminated, spurious induced voltage will not pass through gates 226 and 228.

Referring now to time period $t_1$ of FIGURE 4, it will be seen the strobe pulse and the clock pulse are initiated simultaneously. This operation may be obtained, for example, by triggering the clock pulse source 224 and the strobe pulse source 238 from a single timing source 250, as shown in FIGURE 2, or alternatively, the clock pulse may be fed through a pulse shaping network (not shown) which reforms a clock pulse as a strobe pulse and thereby maintains the proper timing relationship. In this portion of the adder circuit many types of networks are contemplated and are similarly within the skill of the art. Therefore, the examples suggested are not to be construed as limitative of the invention. Referring to time period $t_2$ of FIGURE 4, there is shown the application of an input signal by source 220 to input winding 214. It may be noted that the input signals are initiated prior to the clock pulses (and likewise prior to the strobe pulses) so that the pertinent films are switched and no spurious output signals are produced prior to the output producing operation which occurs during the application of the strobe pulse. This operation may be achieved, for example, by using the aforementioned timing source 250 to activate the input pulse sources 220*a*, 220*b* and 220*c* during one time period (shown as $t_2$) and then the same timing source pulse may activate the clock pulse source after the timing pulse has passed through a proper delay line (which may be part of the sources 224 and 230) whereby the clock pulse is supplied during the time period ($t_3$) next after the time period ($t_2$) in which the input signal appeared. Again this feature of the invention is within the skill of the art and is not meant to be limitative of the invention. When an input pulse is applied to input winding 214, it will be seen that each of the films 200, 202 and 204 (FIGURE 2) is driven to the right one unit during time $t_2$. Thus, referring to the hysteresis characteristics shown in FIGURES 3*a*, *b* and *c*, film 200 is driven to location 308*a*; film 202 is driven to location 318*b*; and film 204 is driven to location 318*c*. Each of the films is, therefore driven along the non-output producing region of its hysteresis film and no voltage is induced in any of the sense windings 230, 232. Furthermore, since there is no strobe pulse applied during time $t_2$, there can be no output signal because gates 226 and 228 do not pass a signal without the concurrent application of the strobe pulse and an output signal. Referring now to time period $t_3$, the input signal maintains the field applied to the films thereby keeping the films switched to the aforementioned locations. At the same time, the clock pulse and the strobe pulse are applied by sources 224 and 238 respectively. The clock pulse applies a further driving current via winding 222 which produces a further driving field that has an order of magnitude similar to the magnitude of the magnetic field applied by the input signal, whereby the clock pulse drives each of the films still further along their respective hysteresis loops. In the case of films 202 and 204 this additional drive applied by the clock pulse has no effective result since these films, though driven, are driven along the no-output producing portion of the hysteresis loop. For example, film 202 is driven from location 318*b* to 314*b*; and film 204 is driven from location 318*c* to location 314*c*. However, when the clock pulse field applies a further drive to film 200, this film is driven along the output producing portion 300*a* of its hysteresis loop from location 308*a* to approximately location 310*a*. When film 200 is driven through this portion of its hysteresis loop, a voltage is induced in winding 232*a*. This signal voltage is fed to gate 226 at the same time that a strobe pulse is fed to gate 226 via wire 234. Since gate 226 is an AND gate, an output signal will be produced at Sum output terminal 244. This output signal represents a Sum output signal.

At the termination of the clock pulse, there is a hiatus at the beginning of time period $t_4$ wherein the D.C. bias current is still applied via windings 206, 208 and 210 so that the films 200, 202 and 204 are reset to their original bias locations (306*a*, 306*b* and 306*c*, respectively). Therefore, when the two input signals shown in time period $t_4$ are applied the several films are driven from their respective bias locations, 306*a*, *b* and *c*. Thus, films 202 and 204 are driven to locations 314*b* and 314*c*, respectively; and film 200 is driven to location 310*a*. The former pair of films do not produce output signals in their output windings since they are driven along the no-output producing portions (304) of their respective hysteresis loops. However, film 200 is driven to location 310*a*; yet the voltage induced in output winding 232 at that time does not produce an output signal due to the absence of a strobe pulse at gate 228.

In the time period $t_5$, both the clock pulse and the strobe pulse are supplied by their respective sources. The clock pulse again produces an additional drive field on each of the films. This additional drive field drives film 200 from location 310*a* to 312*a* and it drives film 202 from location 314*b* to 308*b*. It will be obvious that since these films are being driven along the non-output producing (horizontal) portion of their respective hysteresis loops, no signal voltages will be induced in windings 232*a* or 232*b*. Therefore, even though a strobe pulse is presented during time $t_5$, gate 226 is not activated and no output signal is produced at terminal 244.

However, the clock pulse drives film 204 from location 314*c* to location 316*c* via location 308*c*. Since part of this traversed region (308*c* to 316*c*) lies within the output producing portion 300*c* of the hysteresis loop, a signal voltage is induced in winding 230. This voltage is applied to gate 228 simultaneously with the stroke pulse whereby gate 228 is activated and a Carry output signal is produced at Carry output terminal 246.

Turning now to time period $t_6$, it may be seen that immediately after the termination of the clock pulse of $t_5$, the bias current again resets each of the films to their respective bias locations 306 as discussed previously. Upon the application of an input signal at input winding 218, each of the films is again driven as discussed relative to time period $t_2$. That is, each film is driven along its hysteresis loop a distance equivalent to one (unit) input signal. Thus, again a Sum output signal is produced at Sum output terminal 244 upon the application of one input signal.

During time period $t_8$ no input signals are supplied whereby none of the films are driven out of the reset biased condition. Obviously, since no films are driven to a location which permits the clock pulse to drive the film through the output producing portion of the hysteresis loop during time period $t_9$, no voltages are generated in any of the output windings. Therefore, even though the strobe pulse is applied to the gates 226 and 228, no output signals are produced at the output terminal 244 and/or 246. Subsequently, however, during time period $t_{10}$ input signals are applied on each of the three input windings 214, 216 and 218. These input signals drive each of the films along their respective hysteresis loops a distance equivalent to three units. Thus, film 200 is driven to location 312*a*; film 202 is driven to location 308*b*; and film 204 is driven to location 316*c*. It will be seen from the preceding discussion that film 200 induced a voltage in winding 232*a* when driven through its hysteresis portion 300*a* (which induced voltage will not be passed by gate 226) and will not otherwise produce an output signal. Similarly, film 204 will induce a non-gated voltage when driven between locations 308*c* and 316*c*. However, the films 202 and 204 are driven to locations 308*b* and 316*c* respectively, which will permit the production of an output signal upon the application of the clock pulse and the strobe pulse during time period $t_{11}$. That is, when the clock pulse is applied via winding 222, film 202 will be driven along its hysteresis loop output producing portion 300*b* from location 308*b* to approximately location 310*b*. When film 202 is driven through this hysteresis loop portion, an output signal is produced in winding 232*b* which signal is supplied to gate 226. Since this output pulse and a strobe pulse from source 238 are received substantially simultaneously (or coincidentally) the gate 226 is activated and a Sum output signal is produced at Sum output terminal 244.

Meanwhile, the clock pulse from source 224 during time period $t_{11}$ similarly drives film 204 through its output producing region 300*c*, viz. from location 316*c* past location 310*c*. While being driven between locations 316*c* and 310*c*, the film induces a signal voltage in winding 230. This signal voltage is fed to gate 228 coincidentally with a strobe pulse which is fed from source 238 to gate 228 via wire 236. The coincidence of these signals activates gate 228 whereby an output signal is produced at Carry output terminal 246. Hence, during time period $t_{11}$ a Sum and a Carry output signal are produced responsive to the application of three input signals.

Thus, there has been described the operation of the circuit with one, two or three input signals applied whereby there are obtained, respectively, a Sum, a Carry or a Sum and Carry output signal. This then provides the operation of a logical adder circuit. That is, if a single input is supplied (e.g. time periods $t_2$, $t_6$, $t_{12}$), a Sum output signal is produced only at Sum output terminal 244.

If two input signals are supplied by source 220 (e.g. time period $t_4$) an output signal is produced only at Carry output terminal 246. If three input signals are supplied by source 220 (e.g. time period $t_{10}$), an output signal is produced at both the Sum output terminal 244 and the Carry output terminal 246. Similarly, if no input signals are supplied, no output signals are produced. The operation may be more easily shown by means of a function table.

| Input | Sum | Carry |
|---|---|---|
| 0, 0, 0 | 0 | 0 |
| 0, 0, 1 | 1 | 0 |
| 0, 1, 0 | 1 | 0 |
| 1, 0, 0 | 1 | 0 |
| 1, 1, 0 | 0 | 1 |
| 1, 0, 1 | 0 | 1 |
| 0, 1, 1 | 0 | 1 |
| 1, 1, 1 | 1 | 1 |

Another embodiment of the invention is shown in FIGURE 5*a* wherein the problem of winding coils around the films is eliminated. In FIGURE 5*a*, components similar to those shown in FIGURE 2 bear similar reference numerals. However, a sheet of non-magnetizable material 550, is placed between film 504 and each of the input windings 214, 216 and 218 and the clock pulse winding 222. It is to be understood that, as shown in FIGURES 6 and 8, spacers similar to 550 may be placed between any of the windings on any of the film in order to obtain a similar result. For purposes of explanation, however, FIGURE 5*a* shows only the spacer 550 and film 204. The spacer sheet 550 may be fabricated of a dielectric or diamagnetic material and is utilized so that the magnetizing or driving effect of the input signals upon the film is reduced. Since the driving effect of the signals on the films varies approximately as an inverse proportion of the distance of the driving winding from the film, the thickness of the spacer sheet 550 will be at least partialy determined by the reduction of field-effect necessary. That is, both the thickness of the spacer and the type of material of the spacer will determine the attenuation of the field-effects therethrough. Dielectric material, for example ceramic, may be used to space the conductor (driving wire) from the film if only slight field-effect reduction is necessary. However, if large field-effect reductions are necessary especially in small distances, a diamagnetic material, for example copper, may be used.

Typically, the thickness of spacers used is of the order of magnitude of the dimensions of the winding conductors. For example, with a winding conductor having a diameter of about 1 mil, the spacer will be approximately 1 mil thick. Clearly, however, if the thickness of the spacer is desired to be larger or smaller these dimensions are within the concept of the instant invention.

In the example of the embodiment shown in FIGURE 5*a*, the magnetizing field effect on the film is reduced by the spacer to one-half-unit effect. That is, the driving windings are properly spaced from the film so that with the application of a unit input signal (or clock pulse) by the input (or clock) source, the driving field effected in film 204 is reduced to one-half unit driving field. This embodiment permits the utilization of a bias winding 210 which has only N turns (as compared with 2N turns in the embodiment of FIGURE 2).

The hysteresis characteristic for film 204 as utilized in the embodiment of FIGURE *5a*, is shown in FIGURE *5b*. It will be seen, that the embodiment of FIGURE *5a* will operate substantialy the same as did the embodiment of FIGURE 2, but avoids some of the problems involved in producing the bias windings on these extremely thin magnetic films. That is, the film 204 is biased to location 506 initially and is driven along portion 504 to location 514 by a single input signal. Clearly, a clock pulse applied on winding 222 will drive the film to approximately location 508 without producing an output signal. Likewise, if two or three input signals are applied to the input windings, the film will be driven to locations 508 or 516 respectively; and the application of a clock pulse to the film after it has been switched, will drive the film along portion 518 whereby an output signal will be produced on output winding 230. The substitution of this embodiment into FIGURE 2 provides substantially the same logical adder circuit operation shown in FIGURE 4.

It should be understood, that the principle of the embodiment of FIGURE *5a* may be extended and different spacer sheets may be placed, respectively, between each of the films and the windings associated therewith. For example, in the embodiment shown in FIGURE 6, spacer 650 is placed between film 600 and drive windings 214, 216, 218 and 222; spacer 652 is placed between film 602 and drive windings 214, 216, 218 and 222; and spacer 654 is placed between film 604 and drive windings 214, 216, 218 and 222. Each of these spacers has a different thickness (and/or is made of a different material) so that the magnetizing effect of the drive signals applied to the films via the drive (clock and input) windings is different in each film. By providing this type of structure wherein the spacers are located between the films and the associated clock and input windings, the number of turns in the bias winding 610 on each of the films 200, 202 and 204 may be reduced to 1. Moreover, this structure permits the elimination of actually winding a different coil around each of the separate films. Therefore, the bias winding 610 (and other windings) may all be provided by means of separate conducting strips mounted on an electrical circuit board (not shown), in any of the known ways, which circuit board is then mounted adjacent the thin films. In addition, the spacer sheets 650, 652 and 654 may also be mounted on this circuit board, by deposition for example. Thus, when the circuit board is mounted adjacent the thin films, the conductors of the drive windings, (winding 610, etc.) are properly spaced from the film by the spacer sheets so that the proper magnetizing effects are produced in the films by the currents flowing through the conductors.

It should be noted that the signal voltages supplied to gate 226 by the output windings **232*a* and 232*b* may have different magnitudes because of the elimination of the magnetizing effects by the spacers. Therefore, the gate may be so designed that it is operative for the smaller signal voltage induced in the output winding. Of course, the gates are operative when simultaneously supplied with signal voltage and a strobe pulse. Alternatively, the spacer 650 may be extended (see dotted lines 650*a*) to limit the effect of the flux change in the film on the output winding 232*a*** thereby attenuating the signal produced.

Referring now to FIGURES *7a*, *7b* and *7c*, the hysteresis characteristics for the films 600, 602 and 604 respectively (shown in FIGURE 6) are described. It will be seen that each of the films is biased to the same level of saturation (represented by arrow 728). Thus, film 600 is biased to location **706*a*; film 602 is biased to location 706*b*; and film 604 is biased to location 706*c*. Because of the spacers 650, 652 and 654, the magnetizing effects of the input and clock signals on each of the films is different. For example, assuming the magnetizing effect of one input or clock signal upon film 600 to be unity, the magnetizing effects of unit inputs or clock pulses on the films 600, 602 and 604 correspond to the ratio 1:⅓:½. That is, films 600, 602 and 604 are respectively driven by 1, ⅓ and ½ unit magnetizing forces. Thus it may be seen that the operation of this circuit is similar to that shown in FIGURE 3. That is, the application of a single input (arrow 720*a*) via one of the input windings, will drive film 600 to location 708*a*, or the threshold value beyond which is the output producing portion 700 of the hysteresis characteristic. This same single input signal (arrow 720*a*, 720*b* and 720*c*) will drive films 602 and 604 to locations 718*b* and 718*c*, respectively. Since the clock pulse windings are also spaced from the films, the magnetizing effect produced thereby is reduced in each film by the same proportion as the input signal. Consequently, when a clock pulse is applied, the film 600 is driven through its output producing state to location 710*a*. As described before, a strobe pulse is applied to the Sum output gate 228 and a Sum output signal is produced at Sum terminal 244. However, the attenuated effects of the clock pulse cause films 602 and 604 to be driven only to locations 714*b* and 708*c*, respectively. Since neither of these latter two films are driven through their output producing states, Carry output signals are not received at gate 228 and no Carry output signal is produced at terminal 246**.

Clearly, by similar operation, the simultaneous application of two input signals via the input windings will drive films 600, 602 and 604 to locations **710*a*, 714*b* and 708*c*, respectively. The subsequent application of a clock pulse will, of course, drive film 604 through its output producing state and a Carry output signal will be produced at terminal 246 by the coincident signals at gate 228. Again, output signals will not be produced by films 600 or 602** since the films are not driven through their output producing state by the clock pulse.

Finally, it is also clear that the simultaneous application of three input signals via the input windings will drive films 600, 602 and 604 to locations **712*a*, 708*b* and 716*c*, respectively. The subsequent application of a clock pulse will drive films 602 and 604 to their output producing states thereby producing signals on windings 230 and 232. These signals are applied, to gates 226 and 228 simultaneously with the strobe pulse such that output signals are produced at terminals 244 and 246**.

It will be seen that the operation of the circuit of FIGURE 6 is similar to the operation of FIGURE 2 as depicted in FIGURES *3a*–*3c*. The advantage obtained by using the arrangement of FIGURE 7 is that the windings used with each film may be single conductors etched, deposited or the like, on a separate circuit board whereby the necessity for winding a plurality of turns around each film may be eliminated.

A further embodiment of the invention is shown in FIGURE 8. This embodiment is similar in operation to the embodiments shown in FIGURES 3 and 6. In FIGURE 8, the spacers 850, 852 and 854 are similar to spacers 650, 652 and 654. However, spacers 850, 852 and 854 are placed between the films 800, 802 and 804 and the bias winding 810. Thus, by utilizing spacers (as previously described) having different thicknesses or different materials, the several films may be biased to different levels of saturation (see FIGURES *3a*–*3b*). However, because of the attenuating effect of the spacers, the bias winding may be a single etched, etc., conductor and differnt windings having a different number of turns need not be employed. The operation of the circuit of FIGURE 8 is identical to that of FIGURE 2 and the hysteresis characteristics of FIGURES *3a*, *3b* and *3c* are applicable.

This structural arrangement is advantageous in that the spacers are placed at one end of the films and problems of alignment during the construction are reduced. Moreover, the output signals produced by the windings are more nearly uniform in magnitude than is the case in the embodiment of FIGURE 6 (and FIGURE 7).

While preferred embodiments of the present invention have been described, variations and combinations will be suggested to those skilled in the art. The foregoing description is, therefore, meant to be illustrative only and should not be considered limitative of the invention, and all modifications as are in accord with the principles described, are meant to fall within the scope of the appended claims.

Having thus described the invention, what is claimed is:

1. A magnetic switching circuit comprising a plurality of thin magnetic film elements, and means for applying magnetizing forces of different magnitudes to said elements, said force supplying means including a single turn winding linked to all of said elements, and non-magnetic spacer means between said winding and at least one of said elements so that said winding is differently spaced from different elements.

2. A magnetic switching circuit comprising three thin magnetic films, a plurality of input windings linked to all of said films, all of said input windings on the same films having the same sense of linkage, separate means for applying energizing currents of the same magnitude to each of said input windings, means including bias windings linked to said films for applying thereto magnetomotive forces of different magnitudes such as to bias said films to different levels of substantial saturation, the biasing magnetomotive force applied to each of said films being greater than the magnetomotive force produced by the energizing current applied to one of said input windings, the sense of linkage of each of said bias windings being opposite to that of said input windings on the same film, and output means including a plurality of output windings linked to selected ones of said films such that each of said output windings is linked to some but not all of said films.

3. A magnetic switching circuit comprising a plurality of separate and distinct thin magnetic film elements, and means for simultaneously applying magnetizing forces of different magnitudes to each of said elements, said force supplying means including a plurality of separate single turn windings linked to said elements, and non-magnetic spacer means between said windings and at least one of said elements so that said windings are differently spaced from different elements.

4. A logical adder circuit comprising three magnetic films, means including bias windings linked to each of said films for applying thereto magnetomotive forces of different magnitudes such as to bias said films to different levels of substantial saturation, a plurality of input windings linked to all of said films with a sense of linkage such as to produce magnetomotive forces of polarity opposite to the polarity of the magnetomotive forces produced by the corresponding bias windings, output means including a first output winding linked to two of said films, a second output winding linked to only one of said films, means for producing a control pulse, and separate AND gate means connected to said output windings and said control pulse means so as to produce an output signal only in response to a signal from the output winding associated therewith coincidentally with a pulse produced by said control pulse means.

5. A magnetic switching circuit comprising three magnetic films, means including biasing windings linked to said films for applying different magnetomotive forces to different films, said biasing means applying a first magnetomotive force of one magnitude to a first one of said films, a second magnetomotive force larger than said one magnitude but less than twice said one magnitude to a second one of said films, and a third magnetomotive force of more than twice said one magnitude to a third one of said films, a plurality of input windings linked to said films, the sense of linkage of said input windings being opposite to the sense of linkage of said bias winding on the same film, and output means including a first output winding linked to two of said films and a second output winding linked to the remaining one of said three films.

6. In combination, a plurality of magnetic films, means including windings linked to said films for applying thereto biasing magnetomotive forces of like magnitudes, a plurality of input coils each having windings linked to said films, the sense of linkage of said input windings being opposite to the sense of linkage of said biasing windings on the same films, separate means for applying energizing current to said input windings, spacer means mounted intermediate said films and said input windings so that the magnetomotive forces applied by each of said input windings are different, driving means including windings linked to said films for applying magnetomotive forces to said films, said spacer means being further mounted intermediate said driving winding and said films whereby the magnetomotive forces applied by each of said driving windings are different, output means including output windings linked to said films, and means for gating the output from said output means.

7. A magnetic switching circuit comprising a plurality of magnetic elements, a plurality of magnetic elements, a plurality of input windings linked to all of said elements, all of said input windings on the same elements having a sense of linkage such as to produce magnetomotive forces of the same polarity, separate means for applying energizing currents of substantially the same magnitude to said input coils, means including bias windings linked to said elements for applying thereto magnetomotive forces of the same polarity and of different magnitudes such as to bias said elements to different levels of substantial saturation, the biasing magnetomotive force applied to a first one of said elements being greater than that produced by the energizing current applied to one of said input coils, the biasing magnetomotive force applied to a second one of said elements being greater than that produced by the energizing currents applied simultaneously to two of said input windings, the biasing magnetomotive force applied to a third one of said elements being greater than that produced by the energizing currents applied simultaneously to three of said input windings, the polarity of said biasing magnetomotive forces being opposite to the polarity of the magnetomotive forces produced by said energizing currents, and output means including a first output winding linked to said first and third elements and a second output winding linked to said second element.

8. A magnetic adder circuit comprising three thin magnetic films, three input windings linked to all of said films, all of said input windings on the same films having the same sense of linkage, separate means for applying energizing currents of the same magnitude to said input winding, means including bias windings linked to said films for applying thereto magnetomotive forces of different magnitudes such as to bias said films to different levels of substantial saturation, the biasing magnetomotive force applied to each of said films being greater than that produced by the energizing current applied to one of said input windings, the biasing magnetomotive force applied to two of said films being greater than that produced by the energizing current applied simultaneously to two of said input windings, the biasing magnetomotive force applied to one of said films being greater than that produced by the energizing current applied simultaneously to all of said input windings, the sense of linkage of each of said bias windings being opposite to that of said input windings on the same film, and output means including a Sum output winding linked to two of said films and a Carry output winding linked to one of said films.

9. A magnetic switching circuit comprising a first, second and third magnetic element, a bias winding linking each of said elements, each of said bias windings having the same number of turns, a first, second and third input winding linked to each of said elements, a first output winding linked to said third element, a second output winding linked to said first and second elements, driving windings linked to each of said elements, and spacer means mounted between selected ones of said magnetic elements and said input and driving windings.

10. A magnetic switching circuit comprising a plurality of magnetic films, means including bias windings linked to said films for applying biasing magnetomotive forces thereto, said biasing magnetomotive forces including a magnetomotive force of one magnitude applied to two of said films and a magnetomotive force of substantially more than said one magnitude applied to a third one of said films, a plurality of input coils each having windings linked to said films, the sense of linkage of said input coil windings being opposite to the sense of linkage of said bias windings on the same films, spacer means located between only one of said two magnetic films and the associated input windings linked thereto, and an output means including output coil having different windings linked to said films.

11. A magnetic switching circuit comprising a plurality of thin magnetic films, means including bias windings linked to said films for producing therein magnetomotive forces of different magnitudes such as to bias said films to different levels of substantial saturation, a plurality of input windings linked to all of said films with a sense of linkage such as to produce magnetomotive forces of polarity opposite to the polarity of the magnetomotive forces produced by the corresponding bias windings, means including driving windings linked to said films for producing therein magnetomotive forces having the same polarity as the magnetomotive forces produced by the corresponding input windings, and output means, said output means including a first output coil having windings linked to first and second ones of said films and a second output coil having a winding linked to only a third one of said films, separate coincident gate means connected to each of said output coils, and means for supplying a gating signal to said gate means such that said gates are enabled by the simultaneous application of said gating signal and an output signal from the associated output coil.

12. A magnetic switching circuit comprising a plurality of magnetic elements, a plurality of input windings linked to all of said elements, all of said input windings on the same elements having a sense of linkage such as to produce magnetomotive forces of the same polarity, separate means for applying energizing currents of substantially the same magnitude to said input windings, means including bias windings linked to said elements for applying thereto magnetomotive forces of the same polarity and of different magnitudes such as to bias said elements to different levels of substantial saturation, the biasing magnetomotive force applied to a first one of said elements being greater than that produced by the energizing current applied to one of said input windings, the biasing magnetomotive force applied to a second one of said elements being greater than that produced by the energizing currents applied simultaneously to two of said input windings, the biasing magnetomotive force applied to a third one of said elements being greater than that produced by the energizing currents applied simultaneously to three of said input windings, the polarity of said biasing magnetomotive forces being opposite to the polarity of the magnetomotive forces produced by said energizing currents, driving means including driving windings linked to each of said elements, said driving windings having the same sense of linkage as said input windings whereby said driving means produces magnetomotive forces in said elements in the same direction as those produced by said energizing currents applied to said input windings, and output means including first output winding linked to said first and second elements and a second output winding linked to said third element.

13. A magnetic switching circuit comprising a plurality of magnetic elements having a substantially linear hysteresis characteristic, biasing means including windings linked to said elements for applying thereto biasing magnetomotive forces of different magnitudes, a plurality of input windings linked to each of said elements, the sense of linkage of said input windings being opposite to the sense of linkage of said biasing windings on the same elements, means for applying energizing currents to separate ones of said input windings, and output means including output windings linked to said elements, said biasing means being operative to initiate restoration of said elements to the original magnetic state and saturation level determined by said biasing magnetomotive forces after the termination of said energizing currents in said input windings.

14. A magnetic switching circuit comprising first, second and third magnetic films, means including a winding linking each of said films for producing magnetomotive forces to maintain each of said films at one magnetic level, means including a plurality of input windings linked to said films to drive said films to another magnetic level, a first output coil having windings linked to said first and second films for producing voltage signals when the magnetic state of either film is changed, and a second output coil having a winding linked to said third film for producing a voltage signal when the magnetic state of the third film is changed.

References Cited by the Examiner

UNITED STATES PATENTS

| | | | |
|---|---|---|---|
| 2,696,347 | 12/54 | Lo | 340—174 X |
| 2,919,432 | 12/59 | Broadbent | 340—174 |
| 2,921,737 | 1/60 | Chen | 235—176 |
| 2,993,197 | 7/61 | Broadbent | 340—174 |
| 3,070,783 | 12/62 | Pohm | 340—174 |

OTHER REFERENCES

Publication I: "A Compact Coincident Current Memory," by Pohm and Rubens, in Proceedings of Eastern Joint Computer Conf., pages 120–123, December 1956.

Publication II: "Operating Characteristics of a Thin Film Memory," by Raffel, in Journal of Applied Physics, supp. to vol. 30, No. 4, pages 60S–61S, April 1959.

Publication III: "Using Thin Films in High-Speed Memories," by Bittmann in Electronics, pages 55–57, June 1959.

Publication IV: "Thin Film Balanced Modulator," in Electronics, pages 78 and 80, February 1960.

Publication V: "Thin Film Memory," by Ford, in IBM Technical Disclosure Bulletin, vol. 2, No. 5, page 84, February 1960.

MALCOLM A. MORRISON, *Primary Examiner.*

IRVING L. SRAGOW, *Examiner.*